L. S. SCHMIDT.
WATER COOLED FLOOR.
APPLICATION FILED OCT. 26, 1915.

1,234,222. Patented July 24, 1917.

WITNESSES
J. Herbert Bradley.
Lois Wineman.

INVENTOR
L. S. Schmidt
by W. G. Doolittle
Attorney.

UNITED STATES PATENT OFFICE.

LAWRENCE S. SCHMIDT, OF PITTSBURGH, PENNSYLVANIA, ASSIGNOR TO SCHMIDT-McCORMICK COMPANY, OF PITTSBURGH, PENNSYLVANIA, A CORPORATION OF PENNSYLVANIA.

WATER-COOLED FLOOR.

1,234,222.   Specification of Letters Patent.   Patented July 24, 1917.

Application filed October 26, 1915. Serial No. 57,933.

*To all whom it may concern:*

Be it known that I, LAWRENCE S. SCHMIDT, a citizen of the United States, residing at Pittsburgh, in the county of Allegheny and State of Pennsylvania, have invented certain new and useful Improvements in Water-Cooled Floors, of which the following is a specification.

This invention relates to improvements in water cooled floors adapted for use in rolling mills, glass houses, and other buildings where the operations are such as to tend to produce high temperatures, and especially where the character of operation brings material of high temperature into contact with the floor surface on which the workmen are required to move about.

Floors of this type require the use of large quantities of water for cooling purposes. As a result, the water is generally not subjected to filtering or other action for removal of impurities, consequently, the circulating channels of the floors are liable to become clogged through the deposit of impurities, this being especially true where water is secured from a stream or river.

Water cooled floors designed for plants of the character above mentioned have heretofore been of such construction as to prevent cleaning without a removal of the sections comprising the floor, necessitating in many instances a shut down of that portion of the plant having these floors. Owing to the character of service which this type of floor is required to meet, the form or construction of the floor is necessarily somewhat limited and it has heretofore been the practice to pay but slight attention to troubles that may arise through the clogging up of the water circulating channels or passages.

The necessity for removing the sections practically requires that the sections be in the form of comparatively small units in order to be readily handled, and, obviously, the taking up of the sections practically requires stoppage of plant operation. Where the plant is of comparatively large size, necessitating the use of a large number of sections to provide the necessary floor area, this removal and individual cleaning of the sections requires a considerable length of time to complete, and, where the condition arises suddenly and in the midst of plant operation, this loss of time becomes a serious matter.

The present invention aims to overcome these objectionable features by providing a floor structure in which the cleaning of the channels may be effected while the floor sections remain in place, thus preventing any necessity for disarranging the floor structure, and enabling the plant to continue operation during the cleaning operation. In addition, the invention provides a construction by means of which cleaning may be readily effected, thus reducing the time and labor required for cleaning to a minimum.

To these and other ends, my invention consists in the improved construction and combination of parts described herein, illustrated, and pointed out in the appended claims.

In the accompanying drawings.

The sections, in the present embodiment of my invention, are preferably of built-up construction, having a top plate 5 and a bottom plate 6, these plates having the width of the sections and having a suitable length. The plates are spaced apart by longitudinally extending bars 7 and 8, bars 7 forming the side walls of the section, while bars 8 form division walls arranged to produce a continuous channel between the top and bottom plates.

Figure 1:
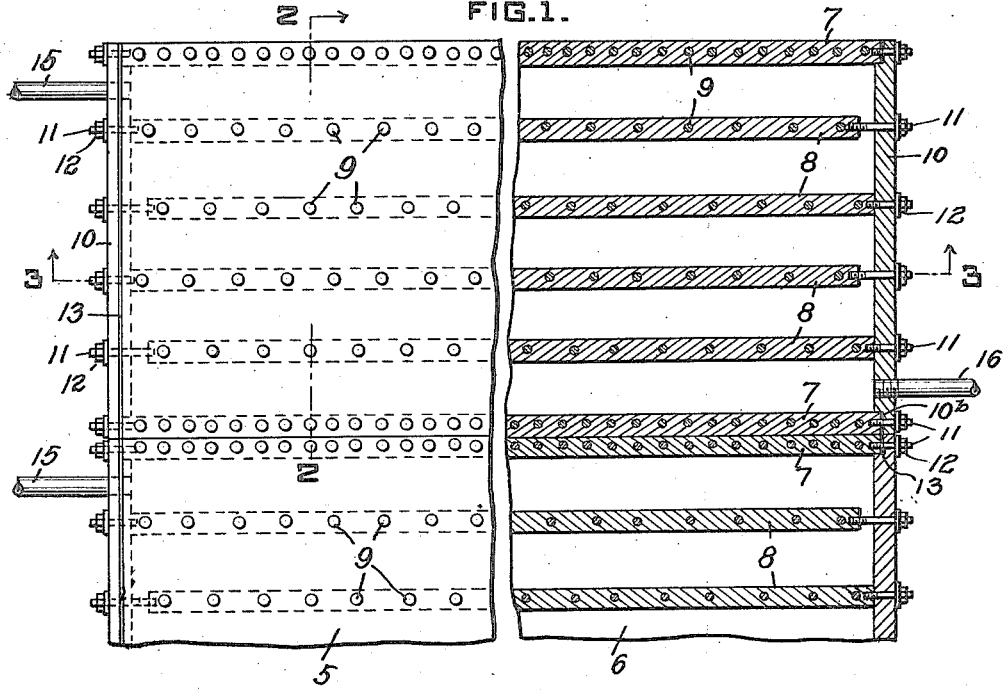
Figure 1 is a plan view of a portion of a floor embodying my invention, parts being broken away for the purpose of showing interior arrangement.

As shown in Fig. 1, the division bars are of a length less than the side bars and are arranged so that the similar ends of alternate bars are located on the same plane while the corresponding ends of adjacent bars are located on different planes.

The side and division bars are preferably arranged parallel with each other and have substantially equal spacing, thus producing parallel circulating channels extending lengthwise of the section of substantially similar area.

Figure 2:
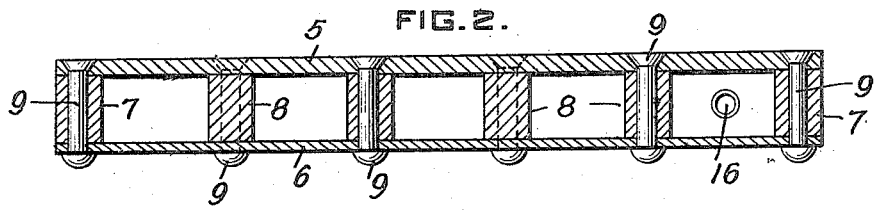
Fig. 2 is a sectional view of the same taken on line 2—2 of Fig. 1, the parts being shown on an enlarged scale.
Figure 3:
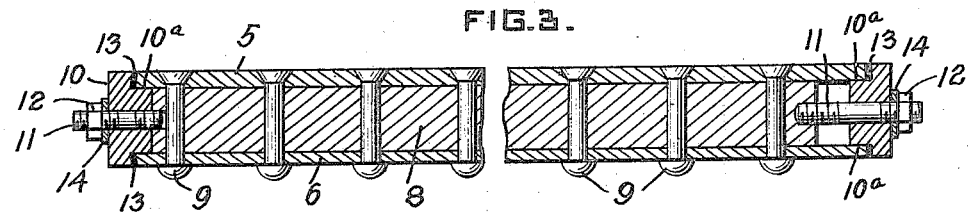
Fig. 3 is a sectional view taken on line 3—3 of Fig. 1, this view being on the scale of Fig. 2.

The top and bottom plates and the side and division bars are secured together in suitable manner, as by rivets 9 which extend through openings in the top and bottom plates and in the bars 7 and 8. The rivets at the top of the section are preferably counter-sunk, as indicated in Figs. 2 and 3, thus providing a practically uniform top surface to the floor and producing a substantially unitary structure.

The ends of the section are closed by removable end members 10, these members having a length equal to the width of the section and having a width equal to the thickness of the section. The members are cut away, as at $10^a$, along the top and bottom to receive the top and bottom plates. This construction permits a portion of each member to project into the space between the top and bottom plates as particularly shown in Fig. 3, forming a spacing element for the top and bottom plates and acting as a support for the top plate, the latter forming the exposed floor surface, the inner surface of the member contacting with the ends of alternate bars 8 and forming walls opposite the ends of the remaining bars 8, as shown more particularly in Fig. 1. The ends of the members are also cut away, as at $10^b$, to receive the ends of the side bars 7. The members 10 are secured in position by suitable bolts 11 threaded into the ends of the bars 7 and 8 and which extend through the members 10, the outer ends of the bolts being threaded to receive suitable securing means, as nuts 12.

I preferably employ washers or gaskets 13 between the ends of the top and bottom plates and the members 10, these washers or gaskets being formed of suitable material such for instance as soft copper, rubber, etc. I also preferably employ gaskets or washers 14 between the nuts 12 and the members 10, these being preferably formed of copper.

As will be seen, the arrangement is such that the gaskets or washers are entirely removed from the face of the channel walls, so that the water in order to reach the gaskets must first leak through the joints which are in advance of the packing. Consequently, little if any fluid pressure will be placed on the gaskets. As a result, leakage is prevented although the parts may remain in service during extended periods of time before being displaced during cleaning operations.

As seen in Fig. 1, adjacent bolts 11 are of different lengths, this being due to the fact that while one bar 7 contacts with the member and hence requires a bolt of less length, the adjacent bar has its end spaced from the member, thus requiring the bolt to extend through this space. By the particular arrangement of bars 8, a tortuous channel is formed within the section, the main portions of the channels being in parallelism, adjacent channels being connected by the space at the ends of the bars. As these spaces are located at opposite ends of the section, the cooling fluid will be caused to traverse the entire interior section through a tortuous path. The inlet and outlet for the cooling fluid are located respectively at the extreme ends of this channel.

In the form shown in Fig. 1, the inlet, indicated at 15, is located at the end of the section opposite the end having outlet 16, this being due to the number of bars 8 employed. Should this number of bars be increased or decreased by one, the inlet and outlet would, of course, be located at the same end of the section.

As will be readily understood, this arrangement permits of removal of end members 10 by removing the nuts 12 and washers 14, the removal of these members 10 exposing the entire interior of the section. Since the particular arrangement provides straight channels extending from one end of the section to the other, which channels are unobstructed on the interior of the section it will be obvious that when such interior is exposed by the removal of the end members, all accumulations within the sections can be readily removed by scraping or otherwise as the form of the accumulation may require, the operation being a simple one and quickly performed. As both ends of each of the channels is opened by removal of the members 10 and the interior is free from pockets, this cleaning action becomes one which is exceedingly simple. When cleaned, it is only necessary to restore the end members to their normal positions, whereupon, the cooling fluid may be again introduced to perform its functions.

As shown in Fig. 1, the sections are laid in contacting relation, thus enabling the floor to be built up in a ready manner and of a form possessing the desired strength. Since a cleaning action can be had in the manner indicated, it will be obvious that after the floor has been placed in position, the cleaning of the sections can take place at any desired time without necessitating the removal of a section from its position in the floor and without weakening in any manner the floor structure or affecting working conditions within the plant.

What I claim is:—

1. A cooling floor comprising a plurality of sections having top and bottom plates and tortuous passageways for the circulation of cooling fluid, and means at the ends of the floor for completing such passageways, said means being active as a support for the top plate and removable to expose the passageways throughout their lengths.

2. A cooling floor comprising a plurality of sections each having top and bottom plates and a tortuous passageway for the circulation of cooling fluid, and individual means for each section at the ends of the floor for completing the section passageway, said means being active as a support for the top plate and removable to expose the passageway throughout its length.

3. A cooling floor section comprising top and bottom plates, parallel bars connected to said plates and arranged to form channels, and removable closures for the ends of the channels, said closures forming spacing elements for said plates and active as supports for the top plate.

4. A cooling floor section comprising top and bottom plates, parallel bars connected to said plates and arranged to form channels, removable closures for the ends of the channels, said closures each having a portion entered between the top and bottom plates, and a packing between the ends of the said plates and the closures.

5. A cooling floor section comprising top and bottom plates with intermediate bars adapted to form passageways, removable closures for the ends of the section, said bars and closures being relatively positioned to produce a tortuous channel through the section, and packing between the ends of the top and bottom plates and the closures, said packing being located at a point removed from the ends of the bars.

6. A cooling floor section comprising top and bottom plates, parallel bars extending in the direction of length of the plates to form channels, means for connecting said plates and bars together in fixed relation, and removable closures for the ends of said channels.

7. A cooling floor section comprising top and bottom plates, a plurality of bars between and extending in the direction of length of said plates, said plates overlapping the ends of certain of said bars, means for connecting said plates and bars together in fixed relation, closure members at and adapted to oppose the ends of the plates, and means for removably connecting said members to said bars.

8. A cooling floor section comprising top and bottom plates, a plurality of bars between and extending in the direction of length of said plates, said plates overlapping the ends of certain of said bars, means for connecting said plates and bars together in fixed relation, closure members at and adapted to oppose the ends of the plates, and having a portion extending between said plates, and means for removably connecting said members to said bars.

9. A cooling floor section comprising top and bottom plates, bars between and extending in the direction of length of said plates and spaced apart in the direction of width of the plates to form channels, means for permanently securing said plates and bars together, alternate bars having their ends located on the same plane, and end members mounted at the ends of the plates to form end closures for the channels, one of said members being adapted to contact with one end of such alternate bars, the opposite member being spaced from the opposite ends of these bars, whereby said spaces will act to connect adjacent channels.

10. A cooling floor section comprising top and bottom plates, bars between and extending in the direction of length of said plates and spaced apart in the direction of width of the plates to form channels, means for permanently securing said plates and bars together, alternate bars having their ends located on the same plane, adjacent bars having similar ends on different planes, and end members mounted at the ends of the plates to form end closures for the channels, one of said members being adapted to contact with one end of such alternate bars, the opposite member being spaced from the opposite ends of these bars, whereby said spaces will act to connect adjacent channels.

11. A cooling floor section comprising top and bottom plates, bars between and extending longitudinally of the plates and adapted to form parallel channels, an end member at each end of the plates adapted to form a closure for the channels at such end, bolts carried by the ends of said bars and adapted to extend through the closure members, and removable means for securing said end members in closure position.

12. A cooling floor section comprising top and bottom plates, bars between and extending longitudinally of the plates and adapted to form parallel channels, means for securing said plates and bars in fixed relation, an end member at each end of the plates and having a portion extending between such plates to form a closure for the channels at such end, bolts carried by the ends of said bars and adapted to extend through the closure members, and removable means for securing said end members in closure position.

13. A cooling floor section comprising top and bottom plates, bars between and extending longitudinally of the plates and adapted to form parallel channels, means for securing said plates and bars in fixed relation, an end member at each end of the plates and having a portion extending between such plates to form a closure for the channels at such end, packing interposed between the ends of said plates and the adjacent end member, bolts carried by the ends of said bars and adapted to extend through the closure members, and removable means for securing said end members in closure position.

In testimony whereof, I affix my signature in presence of two witnesses.

LAWRENCE S. SCHMIDT.

Witnesses:
S. A. McFarland,
W. G. Doolittle.